(12) United States Patent
Rose

(10) Patent No.: US 8,438,778 B2
(45) Date of Patent: May 14, 2013

(54) CANE-TYPE PLANT CHEMICAL DISPENSER

(76) Inventor: Thomas C. Rose, Weddington, NC (US)

(*) Notice: Subject to any disclaimer, the term of this patent is extended or adjusted under 35 U.S.C. 154(b) by 952 days.

(21) Appl. No.: 12/536,467

(22) Filed: Aug. 5, 2009

(65) Prior Publication Data

US 2011/0030272 A1 Feb. 10, 2011

(51) Int. Cl.
*A01C 15/02* (2006.01)
*A01M 21/04* (2006.01)

(52) U.S. Cl.
USPC ............... 47/1.5; 47/48.5; 47/57.5; 401/205; 401/206; 401/262; 401/264; 111/7.3

(58) Field of Classification Search ............. 47/1.5, 47/57.5, 1.7, 66.6, 79, 82, 40.5, 48.5; 401/205, 401/206, 262, 264; 111/7.3; *A01M 21/04; A01C 15/02*
See application file for complete search history.

(56) References Cited

U.S. PATENT DOCUMENTS

| | | | | | |
|---|---|---|---|---|---|
| 2,209,731 | A | * | 7/1940 | Holmes | 111/7.3 |
| 2,577,687 | A | * | 12/1951 | Lee | 222/449 |
| 2,887,117 | A | * | 5/1959 | Rosholt | 132/107 |
| 2,979,757 | A | * | 4/1961 | Norman | 401/206 |
| 3,096,534 | A | * | 7/1963 | Jones | 15/244.1 |
| 3,252,446 | A | * | 5/1966 | Bateman | 401/202 |
| 3,832,803 | A | * | 9/1974 | Blake et al. | 47/57.5 |
| 4,004,854 | A | * | 1/1977 | Breer, II | 401/205 |
| 4,027,986 | A | * | 6/1977 | Patrick | 47/1.5 |
| 4,278,360 | A | * | 7/1981 | Lorscheid et al. | 401/151 |
| 4,328,640 | A | * | 5/1982 | Revelle | 47/1.5 |
| 4,409,755 | A | * | 10/1983 | Maddock | 47/1.5 |
| D274,597 | S | * | 7/1984 | Baumber | D8/2 |
| 4,578,895 | A | * | 4/1986 | Baumber | 47/1.5 |
| 4,882,874 | A | * | 11/1989 | Paulson et al. | 47/1.5 |
| 4,965,960 | A | * | 10/1990 | Moore | 47/1.5 |
| 5,216,833 | A | * | 6/1993 | Longer | 47/1.5 |
| 5,505,019 | A | * | 4/1996 | Paulson | 47/1.5 |
| 5,555,673 | A | * | 9/1996 | Smith | 47/1.5 |
| 6,367,714 | B1 | * | 4/2002 | Smoot | 239/288.5 |
| 7,988,376 | B2 | * | 8/2011 | Todd | 401/186 |

* cited by examiner

*Primary Examiner* — Rob Swiatek
*Assistant Examiner* — Michael Kreiner
(74) *Attorney, Agent, or Firm* — James M. Harrington; Harrington Law, P.C.

(57) ABSTRACT

Apparatus for selectively applying a liquid plant chemical such as a herbicide to a plant includes a hollow tubular reservoir, an integrated funnel handle at the upper end of the reservoir, and an applicator tip at the lower end of the reservoir. The applicator tip includes a valve and a wick that allows the chemical to be dispensed in a controlled manner onto a specific plant, avoiding chemical drift. A protective cap fits over the applicator tip during storage, while retainer tabs keep the protective cap from squeezing the wick. The retainer tabs may be sharp enough to prick the plant to place the chemical internally.

11 Claims, 3 Drawing Sheets

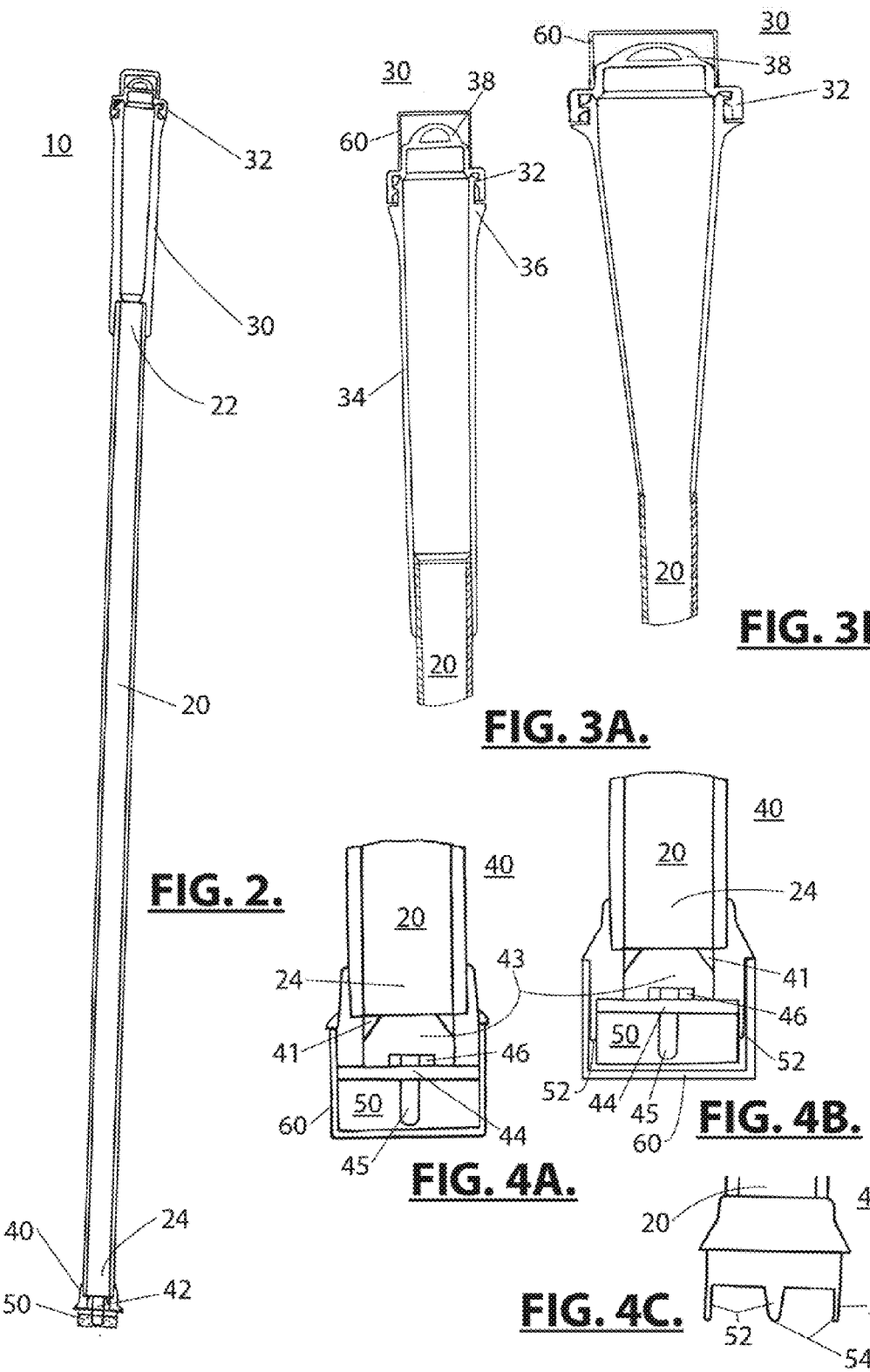

CANE-TYPE PLANT CHEMICAL DISPENSER

FIELD OF THE INVENTION

The present invention relates generally to an apparatus for selectively applying plant chemicals such as herbicides, and more particularly to a cane-type plant chemical dispenser having certain improved features that facilitate easier, more effective, and safer use.

BACKGROUND OF THE INVENTION

Various chemicals, such as fertilizers and herbicides, are used in horticulture to manage plant growth by improving the health of desirable plants and killing undesirable weeds. These plant chemicals are typically applied by spraying. However, spraying is non-selective. Spraying herbicides tends to destroy all plant life in the sprayed area. It is often desirable to apply herbicides and other plant chemicals only to certain vegetation, for example to kill weeds but to leave desirable plants unharmed.

The Weed-Killer Applicator disclosed in U.S. Pat. No. 2,979,757 is an apparatus that is capable of selectively applying herbicide to a specific area while minimizing exposure to the surrounding areas. The reservoir described therein consists of a narrow tube for containing weed killer. One end of the tube includes a cap that serves as a fill port. At the other end of the tube, a spring-loaded valve governs the release of herbicide onto a sponge. When the sponge is pressed against a weed plant, the valve is actuated, dispensing a small amount of weed killer onto the sponge, which transfers the weed killer to the weed. Because the reservoir is a narrow tube, it is difficult to fill the reservoir, and spillage is a significant problem. This is particularly true if the chemical to be applied is poisonous, but any spillage constitutes waste and is therefore to be avoided.

Various other similar apparatuses for accomplishing this task are known, most of which are variations on the apparatus described above. For example, the "weed destroyer" of U.S. Pat. No. 2,209,731 omits the sponge but instead utilizes a spring-loaded spike to open a wound in the weed and to dispense chemicals into that wound. U.S. Pat. No. 2,577,687 substitutes a footed rod for the spike. U.S. Pat. No. 3,096,534 retains the sponge but omits the reservoir. U.S. Pat. No. 4,409,755 describes an applicator with an offset head and a wide sponge for wipingly applying liquid herbicide.

What is needed is a portable hand-held apparatus capable of selectively applying herbicide and other plant chemicals to the precise area that needs treatment, so that the plant chemical is applied only to the intended plant with a minimum of exposure to other plants in the surrounding area. Such an apparatus should facilitate the filling of the reservoir with the plant chemicals and should minimize the waste and hazards posed by the spilling of those chemicals, both during filling and in general operation.

SUMMARY OF THE INVENTION

In accordance with the aforementioned needs, the present invention includes an apparatus for selectively applying a liquid plant chemical, such as a herbicide, to a plant. The apparatus includes a hollow tubular reservoir that has upper and lower ends, as well as a given reservoir diameter that is selected to be sufficient to store a desired amount of the plant chemical. A handle is disposed at the upper end of the reservoir tube. This handle may be provisioned as a funnel handle, formed integrally with the reservoir tube and flared such that at its lower diameter it is equal to the reservoir diameter but is substantially wider at the top. This facilitates spill-free insertion of the plant chemical into the reservoir, typically by pouring.

A reservoir cap completes the upper portion of the assembly and permits the reservoir to be opened at the top for insertion of the plant chemical into the reservoir, but closed and sealed during operation.

An applicator tip is disposed at the lower end of the reservoir tube. The applicator tip includes a normally closed pressure-sensitive valve. This valve permits selective dispensing of liquid from the reservoir onto a wick. When the applicator tip is placed against the plant, pressure is applied to the valve, causing it to actuate into an open position and thereby allowing the chemical to flow onto the wick. The wick, which is typically a sponge or another absorptive material, becomes saturated and transfers a small amount of the plant chemical onto the selected plant.

The valve may be any suitable valve, but will generally be either of the gravity type, whereby the valve is held closed by the weight of the plant chemical against it, or the spring type, whereby the valve piston is biased into the closed position by the action of a spring.

A protective cap that covers the applicator tip completes the lower portion of the assembly.

In another feature of the invention, the reservoir cap may be provided with a hanging ring, in order to facilitate storage of the apparatus on, for example, a hook. The protective cap and the reservoir cap are dimensioned so that the protective cap can be placed and retained upon the reservoir cap during use, covering the hanging ring and facilitating retention of the protective cap.

In yet another feature of the invention, the applicator tip further includes a number of protective cap retainer tabs that extend about the wick. These tabs define and maintain an offset between the wick and the protective cap in order to prevent the unintended compression of the wick when the protective cap is applied to the applicator tip. These tabs may also be provided with piercing tips, which are sufficiently sharp to pierce the plant in order to enable the chemical to be applied internally.

The plant chemicals applied may include herbicides, pesticides, fertilizers, or any other suitable plant chemical, or indeed any combination thereof, as desired.

In still another feature of the invention, the apparatus length, which is principally defined by the length of the hollow tubular reservoir, is selected so as to allow the application of the plant chemical, by person holding the handle, to a ground-based plant without the necessity of stooping to do so.

The present invention also includes improvements to a cane-type selective plant chemical applicator that includes a hollow-tube reservoir with upper and lower ends and a particular reservoir diameter, a handle disposed at the upper end, and an applicator tip disposed at the lower end and having a pressure-sensitive valve and a wick for contacting a plant to dispense the plant chemical onto it.

One such improvement is the provision and constitution of the handle as a funnel handle integrated with the reservoir and flared between a lower diameter equal to the reservoir diameter and a substantially wider upper diameter, in order to facilitate spill-free insertion of the plant chemical into the reservoir.

Another such improvement is a number of protective cap retainer tabs extending about the wick for defining and maintaining an offset between the wick and a protective cap for it, in order to prevent unintended compression of the wick when the protective cap is applied to the applicator tip.

In a further improvement, at least one of the protective cap retainer tabs is provided with a piercing tip to pierce the plant to apply the plant chemical internally to it.

BRIEF DESCRIPTION OF THE DRAWINGS

Further features, embodiments, and advantages of the present invention will become apparent from the following detailed description with reference to the drawings, wherein:

FIG. 2 is a cross-sectional view of a preferred embodiment of the present invention;

FIGS. 3A-3B are cross-sectional detail views of alternative embodiments of an upper portion of the present invention; and FIGS. 4A-4B and 4D-4E are cross-sectional detail views of alternative embodiments of a lower portion of the present invention; and FIG. 4C is a partial detail view of an alternative embodiment of a lower portion of the present invention.

DETAILED DESCRIPTION OF THE PREFERRED EMBODIMENTS

Figure 1:
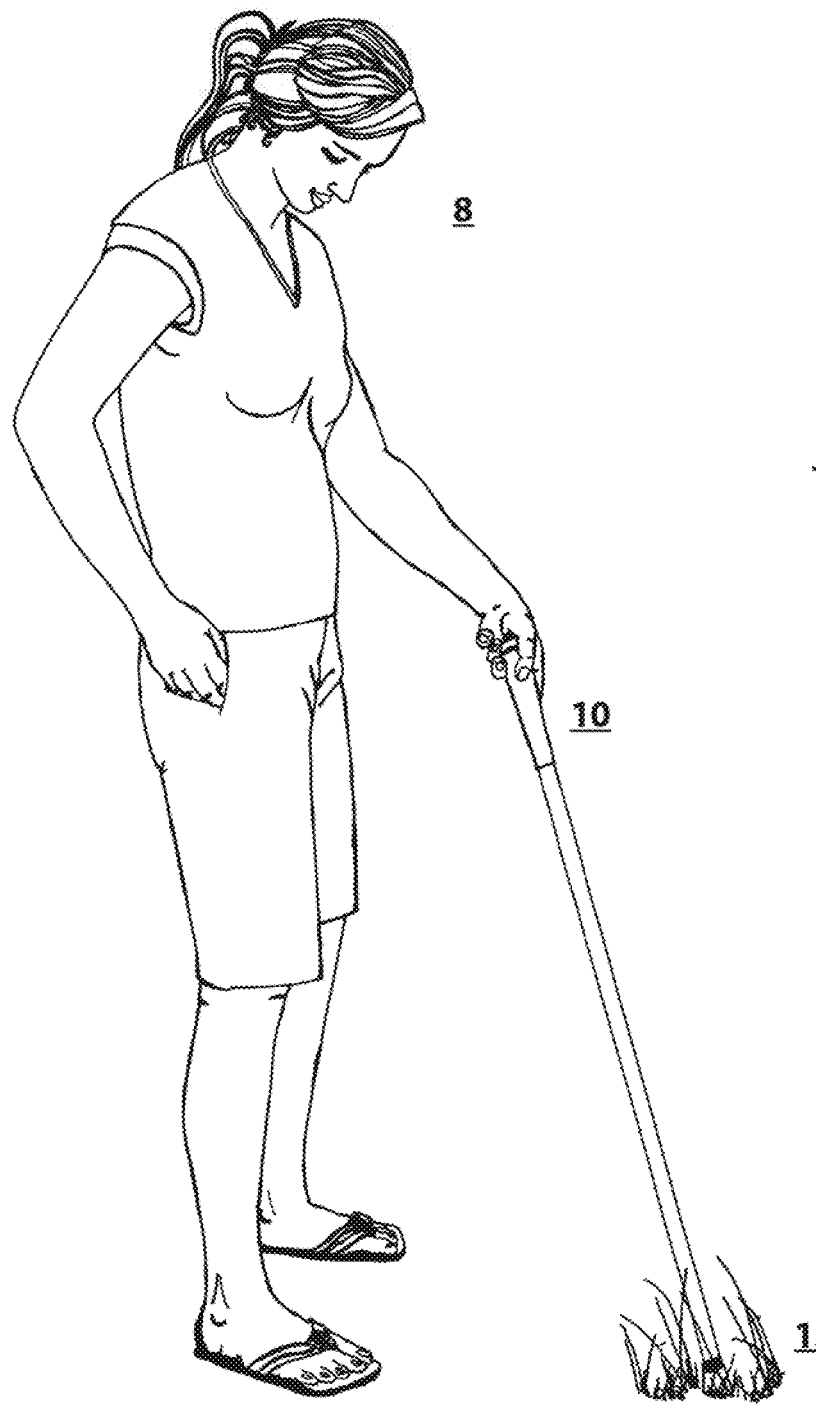
FIG. 1 is an environmental view of a preferred embodiment of the present invention.

Referring now to the drawings, a cane-type plant chemical dispenser 10 according to the present invention is shown in use, in an environmental view in FIG. 1. As can be seen in this environmental view, a number of the advantages of the present invention become apparent. The user 8 is shown utilizing the dispenser 10 to apply a plant chemical, such as a herbicide, a pesticide, or a fertilizer, to the plant 12. The plant chemical may be applied in a controlled and highly selective manner. Unlike spraying-type applications, the present invention permits the herbicide to be applied only to those plants the dispenser touches, so that herbicide is not applied to a desirable plant, or targeted fertilizers or pesticides are conserved and applied only to those plants that need them. The dispenser 10 is long enough that the user 8 may reach ground level with it, to apply the chemical, without stooping. Further features will be described in greater detail below.

Referring now to FIG. 2, the present invention is shown in a cross-sectional view, with the section taken vertically through the apparatus 10 approximately through its center. The dispenser 10 includes a hollow tubular reservoir 20 suitable for retention and storage of a plant chemical such as a herbicide to be dispensed to a plant (not shown; see FIG. 1). The reservoir 20 has upper end 22 and lower end 24, and may be formed from any material suitable for forming the desired shape, including metal, plastic, or any other similar material. The reservoir 20 has a characteristic length that is selected to allow the user to reach plants at ground level without having to stoop, as well as a characteristic diameter that may be selected, in consideration of the length, to provide for storage of a sufficient volume of plant chemical to obviate the necessity of frequent refilling, without creating excessive weight that would make the dispenser cumbersome to control or tire the user easily.

The upper end 22 of the reservoir 20 is provided with a handle 30. Further details and alternative embodiments of the handle will be discussed in connection with FIGS. 3A and 3B, but generally, the handle 30 is selected to provide a gripping location for the user's hand and will be sized accordingly. The handle 30 will also ideally be provided with or constituted as a soft grip and perhaps molded to an appropriate grip shape, so as to allow for comfortable and ready control. The handle 30 is, in a preferred embodiment, hollow in the same manner as the reservoir 20.

The handle 30 is capped with a reservoir cap 32, which serves to open the reservoir 20 to allow plant chemicals to be inserted therein, likely by pouring. This reservoir cap 32 may be of the screw-on type to ensure a tight seal, but other modes of attachment are possible without departing from the scope of the invention.

The lower end 24 of the reservoir 20 is provided with an applicator tip 40, further details and alternative embodiments of which will be discussed in connection with FIGS. 4A and 4B. The applicator tip 40 is designed to contact the plant to which the chemical is to be applied. The applicator tip 40 principally includes a valve 42 and a wick 50. The valve 42 is held a normally closed position and is designed to be actuated to open the reservoir 20 to allow the chemical to flow, or at least trickle, therefrom and onto the wick 50. This actuation is accomplished in a preferred embodiment by pressing the applicator tip against the plant.

The wick 50 is constituted as an absorbent material that is at least somewhat compressible, such as a sponge or another such material. The wick 50 is designed to receive the flow of chemical through the valve 42 and, through absorption and saturation, to control that flow and transfer the chemical to the plant the wick touches. This arrangement prevents uncontrolled flow and unwanted dripping of the chemical, while readily permitting the chemical to be easily dispensed and transferred to the plants to which the user 8 desires to apply it.

The applicator tip 40 will preferably be covered with a protective cap (see FIGS. 4A-4B) when the dispenser is not in use.

Referring now to FIGS. 3A and 3B, further details of the handle portion 30 of the present invention are shown in cross-sectional views of alternative embodiments. In FIG. 3A, the diameter of the handle 30 is closely matched to that of the reservoir 20 and may be rightly considered merely as an extension of the reservoir 20, with slight tapering being provided by the grip 34. The grip 34 may also include a tapered shoulder 36 that provides a point of resistance to aid in holding the dispenser 10. On its top side, this tapered shoulder 36 provides a seat for the reservoir cap 32, which is shown as a screw-on type reservoir cap 32.

The reservoir cap 32 may also include a hanging ring 38 that permits the dispenser 10 to be placed on a hook, nail, or other point (not shown) during storage. The reservoir cap 32 is ideally shaped to have a region with an outside diameter that is matched to the outside diameter of a protective cap 60, so that the protective cap 60 may be placed upon the reservoir cap 32 when the dispenser 10 is in use. This assists the user in avoiding loss of the protective cap 60 by providing a convenient place to store it during use such that it is ready to replace when use is complete. The protective cap 60 will also cover up the hanging ring 38.

The embodiment illustrated in FIG. 3B shows an important feature of the present invention. Rather than the diametric matching of the handle 30 to the reservoir 20 as in FIG. 3A, the handle 30 in FIG. 3B is flared and amounts to a funnel handle. The funnel handle 30 is preferably integrated with the reservoir 20 and has a lower diameter that is matched to the reservoir diameter. The funnel handle 30 transitions to a substantially wider upper diameter, so that the funnel handle 30 has a wider "mouth" than the alternative embodiment should in FIG. 3A. This is of significance to the present invention because a wider mouth allows for the plant chemicals to be poured into the reservoir 20 more easily, with a substantially reduced chance of spillage. While the same effect could be accomplished using a narrow handle plus a funnel, the preferred embodiment shown in FIG. 3B presents a distinct advantage in that the user need not worry about residue of the plant chemical remaining on a separate funnel—a condition that potentially leads to spillage and/or cross-contamination of chemicals.

Figure 4D:
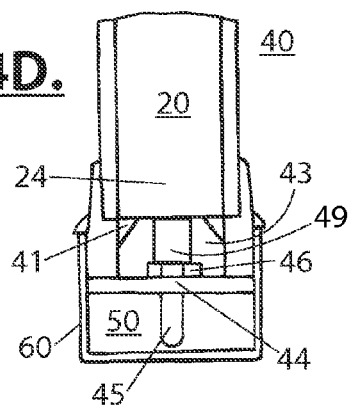
Figure 4E:
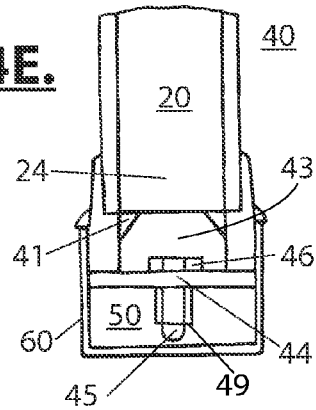

Referring now to FIGS. 4A-4B, further details of the applicator tip 40 are shown in a cross-sectional view. The reservoir 20 is sealed at its lower end 24 by the applicator tip 40, which includes a shoulder 41 upon which the reservoir 20 rests in a sealing relationship. Plant chemicals are free to flow into a chamber 43 above the valve 42, which in a preferred embodiment consists of an aperture 44 and a piston 45. The piston 45 is slightly smaller in diameter than and disposed through the aperture 44, and the flange 46 of the piston 45 is normally urged into contact with the face of the applicator tip 40 by the weight of the plant chemical, closing the valve. In the alternative embodiments shown in FIGS. 4D-4E, the flange may be biased into contact with the applicator tip face by a spring 49.

Attached to the underside of the applicator tip 40 is a touch-point sponge applicator or wick 50, as described above. The wick 50 is compressible when urged into contact with, for example, a plant, and that action exerts an upward force upon the piston 45, opening the valve 42 and allowing the plant chemical to exit the reservoir onto the wick 50. The wick 50 then transfers a small amount of the chemical to the plant. The protective cap 60 is designed to cover the wick 50 when the dispenser is not in use, by fitting closely about the applicator tip 40 over the wick 50.

One potential problem associated with the arrangement described above is that in placing the protective cap 60 over the applicator tip 40, it is possible to compress the wick 50, causing the plant chemical to be secreted out onto the user's hand or otherwise spilling. For that reason, in the preferred alternative embodiment shown in FIG. 4B, the applicator tip is provided with a set of retainer tabs or prongs 52. These retainer tabs 52, preferably numbering three or four, are disposed about the wick 50. The retainer tabs 52 allow the protective cap 60 to be offset somewhat from the wick 50. Because the protective cap 60 in this embodiment is somewhat larger than the wick 50, and because the retainer tabs 52 provide a rigid offset between the wick 50 and the protective cap 60, the chances of mis-seating the protective cap 60 on the wick 50 (and thereby squeezing the wick 50) are substantially reduced.

Referring now to FIG. 4C, the retainer tabs 52 are shown in a non-sectional detail view. The presence of these retainer tabs 52 also permits an additional improvement. If the retainer tabs 52 are provided with sharp piercing tips 54, they may act to prick or pierce the plant, which may permit more effective delivery of the chemical to the plant. This is particularly helpful when the chemical to be applied is a herbicide, because piercing the plant allows the chemical to access the xylem, which in turn carries the chemical throughout the plant.

Because the plant chemicals are not sprayed broadly, it may be useful to keep track of those plants to which the chemical has or has not been applied. This may be readily accomplished by introducing a dye into the liquid chemical, so that the user can easily see which plants have been treated and which have not.

Referring again more generally to the drawings, the dispenser 10 is operated by positioning the applicator end 40 of the dispenser 10 against a plant on the ground and applying downward pressure via the handle 30 of the apparatus. This pressure causes a normally closed valve 42 in the applicator tip 40 to open, thereby releasing a plant chemical contained in the reservoir 20 onto the sponge or wick 50. The chemical will be transferred only to the plant on which the sponge 50 is placed. Flow of the chemical is stopped by releasing the pressure on the handle 30 which returns the valve 42 to its normally closed position.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by any claims appended hereto and the equivalents thereof.

What is claimed is:

1. An apparatus for selectively applying a liquid plant chemical to a plant, comprising:
   a hollow tubular reservoir having upper and lower ends and a reservoir diameter;
   a handle disposed at the upper end of the reservoir;
   a reservoir cap disposed at the top of the handle, whereby the reservoir may be opened for the insertion of the plant chemical into the reservoir and closed;
   an applicator tip disposed at the lower end of the reservoir, the applicator tip comprising a normally closed pressure-sensitive valve, a wick, and a plurality of protective cap retainer tabs extending about the wick for defining and maintaining an offset between the wick and the protective cap to prevent unintended compression of the wick when the protective cap is applied to the applicator tip; and
   a protective cap adapted to cover the applicator tip during periods of non-use;
   wherein the applicator tip is placed against the plant to actuate the valve to dispense the plant chemical onto the wick for selective transfer to the plant; and
   wherein each of the protective cap retainer tabs is provided with a sharp piercing tip to pierce the plant to apply the plant chemical internally thereto.

2. An apparatus according to claim 1, wherein the handle comprises a funnel handle disposed at the upper end of the reservoir, the funnel handle being integrated with the reservoir and flared between a lower diameter equal to the reservoir diameter and a substantially wider upper diameter, to facilitate spill-free insertion of the plant chemical into the reservoir.

3. An apparatus according to claim 1, further comprising a hanging ring disposed upon the reservoir cap to facilitate storage of the apparatus on a hook.

4. An apparatus according to claim 3, wherein the protective cap and the reservoir cap are dimensioned to permit placement of the protective cap upon the reservoir cap to cover the hanging ring and to facilitate retention of the protective cap during use.

5. An apparatus according to claim 1, wherein the plant chemical is a herbicide.

6. An apparatus according to claim 1, wherein the plant chemical is a fertilizer.

7. An apparatus according to claim 1, wherein the plant chemical is a pesticide.

8. An apparatus according to claim 1, wherein the hollow tubular reservoir is dimensioned to allow application of the plant chemical by a person holding the handle to a ground-based plant without necessity of stooping.

9. An apparatus according to claim 1, wherein the valve is held in its normally closed position by the weight of the plant chemical disposed thereagainst.

10. An apparatus according to claim 1, wherein the valve is biased into a normally closed position by action of a spring.

11. In a cane-type selective plant chemical applicator comprising a hollow-tube reservoir having upper and lower ends and a reservoir diameter, a handle disposed at the upper end, and an applicator tip disposed at the lower end and having a pressure-sensitive valve and a wick for contacting a plant to dispense a plant chemical thereto, the improvement comprising:

the provision and constitution of the handle as a funnel handle integrated with the reservoir and flared between a lower diameter equal to the reservoir diameter and a substantially wider upper diameter, to facilitate spill-free insertion of the plant chemical into the reservoir; and a plurality of protective cap retainer tabs extending about the wick for defining and maintaining an offset between the wick and a protective cap therefor, to prevent unintended compression of the wick when the protective cap is applied to the applicator tip;

wherein at least one of the protective cap retainer tabs is provided with a sharp piercing tip to pierce the plant to apply the plant chemical internally thereto.

* * * * *